(12) United States Patent
Komu et al.

(10) Patent No.: US 11,329,988 B2
(45) Date of Patent: May 10, 2022

(54) ACCESS TO A SERVICE IN A NETWORK

(71) Applicant: Telefonaktiebolaget LM Ericsson (publ), Stockholm (SE)

(72) Inventors: Miika Komu, Helsinki (FI); Alireza Ranjbar, Espoo (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 16/625,416

(22) PCT Filed: Jun. 28, 2017

(86) PCT No.: PCT/EP2017/066026
§ 371 (c)(1),
(2) Date: Dec. 20, 2019

(87) PCT Pub. No.: WO2019/001704
PCT Pub. Date: Jan. 3, 2019

(65) Prior Publication Data
US 2021/0328993 A1    Oct. 21, 2021

(51) Int. Cl.
*H04L 29/06* (2006.01)
(52) U.S. Cl.
CPC .................. *H04L 63/101* (2013.01)
(58) Field of Classification Search
CPC .................................................. H04L 63/101
See application file for complete search history.

(56) References Cited

U.S. PATENT DOCUMENTS 10,348,767 B1 * 7/2019 Lee .................... H04L 63/1416
10,868,748 B1 * 12/2020 Ramabadran ......... H04L 69/164
2009/0300759 A1 * 12/2009 Wang .................. H04L 63/1458
                                                              726/22

(Continued)

FOREIGN PATENT DOCUMENTS

WO       2014209265 A1    12/2014

OTHER PUBLICATIONS

International Search Report and the Written Opinion of the International Searching Authority, issued in corresponding International Application No. PCT/EP2017/066026, dated Mar. 21, 2018, 10 pages.

(Continued)

*Primary Examiner* — Yonas A Bayou
(74) *Attorney, Agent, or Firm* — Rothwell, Figg, Ernst & Manbeck, P.C.

(57) ABSTRACT

There is provided mechanisms for handling access to a service in a network. A method is performed by a network controller. The method comprises obtaining an indication of the service is accessible in the network. The indication is received from a network switch operatively connecting a server of the service to the network. The indication causes a timer to start. The method comprises obtaining an indication of a client requesting to access the service. The indication is received from the network switch. The method comprises recording, only when the timer has not yet expired, identity information of the client in an access control list. The method comprises providing the access control list at least to the network switch upon expiration of the timer.

20 Claims, 6 Drawing Sheets

(56) References Cited

U.S. PATENT DOCUMENTS

| | | | |
|---|---|---|---|
| 2015/0200949 A1* | 7/2015 | Willhite | H04L 63/101 |
| | | | 726/13 |
| 2015/0288616 A1* | 10/2015 | Liu | H04L 47/70 |
| | | | 709/226 |
| 2016/0065462 A1* | 3/2016 | Ayandeh | H04L 45/66 |
| | | | 370/392 |
| 2016/0072815 A1* | 3/2016 | Rieke | H04L 63/1433 |
| | | | 726/3 |
| 2016/0276089 A1* | 9/2016 | Inoue | H01F 27/292 |
| 2017/0041343 A1* | 2/2017 | Wong | H04L 63/105 |
| 2017/0223005 A1* | 8/2017 | Birgisson | H04L 63/0807 |
| 2018/0069865 A1* | 3/2018 | Rieke | H04L 43/045 |
| 2018/0167338 A1* | 6/2018 | Merchant | H04L 63/1441 |
| 2019/0230086 A1* | 7/2019 | Song | G06N 20/00 |

OTHER PUBLICATIONS

Hu et al. "FlowGuard: Building Robust Firewalls for Software-Defined Networks" HotSDN'14, Aug. 22, 2014, ACM 978-1-4503-2989-7/14/08, 6 pages.

Mattos et al. "AuthFlow: Authentication and Access Control Mechanism for Software Defined Networking" Ann. Telecommun., vol. 71, Nos. 11-12, 2016, 7 pages.

* cited by examiner

ACCESS TO A SERVICE IN A NETWORK

CROSS REFERENCE TO RELATED APPLICATION(S)

This application is a 35 U.S.C. § 371 National Phase Entry Application from PCT/EP2017/066026, filed Jun. 28, 2017, designating the United States, the disclosure of which is incorporated herein by reference in its entirety.

TECHNICAL FIELD

Embodiments presented herein relate to methods, a network controller, a network switch, computer programs, and a computer program product for handling access to a service in a network.

BACKGROUND

In communications networks, there may be a challenge to obtain good performance and capacity for a given communications protocol, its parameters and the physical environment in which the communications network is deployed.

For example, in traditional firewalls, the network administrator typically sets access control rules to services manually based on Internet Protocol (IP) address or IP address ranges. Such access control rules could comprise information, such as in an access-control list, regarding which devices are allowed to access a certain service in the network. In Software Defined Networks (SDN) based access control schemes, such lists could be based on the same identifiers (i.e. IP address or IP address ranges), but the lists are generally centrally managed by the SDN controller, which distributes the lists to the necessary (virtual or physical) network switches. In the SDN based access control schemes, the lists are still manually collected.

Manual collection of IP addresses or IP address ranges for firewalls can be cumbersome. In addition, if deploying firewall types of access control later on in the lifetime of the service, it may be difficult to form an access-control list after years of running the service because all the required IP addresses and IP address ranges may not have been recorded, or the information may be just partial.

A well-known example of firewalls in SDN is disclosed by Hongxin Hu, Wonkyu Han, Gail-Joon Alin, Ziming Zhao in "SERVICE FLOWGUARD: building robust firewalls for software-defined networks" in Proceeding of HotSDN '14 Proceedings of the third workshop on Hot topics in software defined networking, Pages 97-102, 2014. In general terms, this document presents dynamic deployment of network policies on data service flows in the network.

Another example of access control in SDN is disclosed by Diogo M. F. Mattos and Otto Carlos Muniz Bandeira Duarte in "AuthService flow: authentication and access control mechanism for software defined networking", Technical report, April 2014. Available (as of June 2017) on: https://www.gta.ufrj.br/ftp/gta/TechReports/MFD14.pdf. In general terms, this document discloses authentication of the end-host through an external RADIUS server and depending on the security privilege of end-hosts, it implements access control for data service flows.

Different control mechanisms could be applied to limit access to services to only intended users. One alternative is employing application-level authentication. However, unauthorized access might be gained e.g. by exploiting zero-day vulnerabilities, or be a result of the software not being updated regularly.

All software based services do not employ authentication, e.g. if the intended use is in a limited network, such as an intranet, legacy services might not be updated to what is the current security standard with respect to authentication. Authentication might not be added for software that is no longer supported, nor might security flaws be fixed. This is why, in addition to authentication, or as just a standalone security mechanism, constraining access to the service using IP addresses or IP address ranges might at least limit external threats, such as unauthorized access, against the service.

Thus, while access control in SDN is well defined, most available SDN based firewalls implement access control without considering the effort and feasibility of collecting the network policies.

Hence, there is still a need for an improved handling of access to services in a network.

SUMMARY

An object of embodiments herein is to provide efficient handling of access to services in a network.

According to a first aspect there is presented a method for handling access to a service in a network. The method is performed by a network controller. The method comprises obtaining an indication of the service being accessible in the network. The indication is received from a network switch operatively connecting a server of the service to the network. The indication causes a timer to start. The method comprises obtaining an indication of a client requesting to access the service. The indication is received from the network switch. The method comprises recording, only when the timer has not yet expired, identity information of the client in an access control list. The method comprises providing the access control list at least to the network switch upon expiration of the timer.

According to a second aspect there is presented a network controller for handling access to a service in a network. The network controller comprises processing circuitry. The processing circuitry is configured to cause the network controller to obtain an indication of the service being accessible in the network. The indication is received from a network switch operatively connecting a server of the service to the network. The indication causes a timer to start. The processing circuitry is configured to cause the network controller to obtain an indication of a client requesting to access the service. The indication is received from the network switch. The processing circuitry is configured to cause the network controller to record, only when the timer has not yet expired, identity information of the client in an access control list. The processing circuitry is configured to cause the network controller to provide the access control list at least to the network switch upon expiration of the timer.

According to a third aspect there is presented a network controller for handling access to a service in a network. The network controller comprises processing circuitry and a storage medium. The storage medium stores instructions that, when executed by the processing circuitry, cause the network controller to perform operations, or steps. The operations, or steps, cause the network controller to obtain an indication of the service being accessible in the network. The indication is received from a network switch operatively connecting a server of the service to the network. The indication causes a timer to start. The operations, or steps, cause the network controller to obtain an indication of a client requesting to access the service. The indication is received from the network switch. The operations, or steps, cause the network controller record, only when the timer has not yet expired, identity information of the client in an access control list. The operations, or steps, cause the network controller to provide the access control list at least to the network switch upon expiration of the timer.

According to a fourth aspect there is presented a network controller for handling access to a service in a network. The network controller comprises an obtain module configured to obtain an indication of the service being accessible in the network. The indication is received from a network switch operatively connecting a server of the service to the network. The indication causes a timer to start. The network controller comprises an obtain module configured to obtain an indication of a client requesting to access the service. The indication is received from the network switch. The network controller comprises a record module configured to record, only when the timer has not yet expired, identity information of the client in an access control list. The network controller comprises a provide module configured to provide the access control list at least to the network switch upon expiration of the timer.

According to a fifth aspect there is presented a computer program for handling access to a service in a network. The computer program comprises computer program code which, when run on processing circuitry of a network controller, causes the network controller to perform a method according to the first aspect.

According to a sixth aspect there is presented a method for handling access to a service in a network. The method is performed by a network switch operatively connecting a server of the service to the network. The method comprises forwarding an indication of the service being accessible in the network to the network controller. The method comprises forwarding an indication of a client requesting to access the service to the network controller. The method comprises obtaining an access control list from the network controller. The access control list comprises identity information of the client. The method comprises forwarding, to the server, any access requests for the service from clients received after having obtained the access control list only for those clients listed on the access control list.

According to a seventh aspect there is presented a network switch for handling access to a service in a network. The network switch operatively connects a server of the service to the network and comprises processing circuitry. The processing circuitry is configured to cause the network switch to forward an indication of the service being accessible in the network to the network controller. The processing circuitry is configured to cause the network switch to forward an indication of a client requesting to access the service to the network controller. The processing circuitry is configured to cause the network switch to obtain an access control list from the network controller. The access control list comprises identity information of the client. The processing circuitry is configured to cause the network switch to forward, to the server, any access requests for the service from clients received after having obtained the access control list only for those clients listed on the access control list.

According to an eighth aspect there is presented a network switch for handling access to a service in a network. The network switch operatively connects a server of the service to the network and comprises processing circuitry and a storage medium. The storage medium stores instructions that, when executed by the processing circuitry, cause the network switch to perform operations, or steps. The operations, or steps, cause the network switch to forward an indication of the service being accessible in the network to the network controller. The operations, or steps, cause the network switch to forward an indication of a client requesting to access the service to the network controller. The operations, or steps, cause the network switch to obtain an access control list from the network controller. The access control list comprises identity information of the client. The operations, or steps, cause the network switch to forward, to the server, any access requests for the service from clients received after having obtained the access control list only for those clients listed on the access control list.

According to a ninth aspect there is presented a network switch for handling access to a service in a network. The network switch operatively connects a server of the service to the network. The network switch comprises a forward module configured to forward an indication of the service being accessible in the network to the network controller. The network switch comprises a forward module configured to forward an indication of a client requesting to access the service to the network controller. The network switch comprises an obtain module configured to obtain an access control list from the network controller. The access control list comprises identity information of the client. The network switch comprises a forward module configured to forward, to the server, any access requests for the service from clients received after having obtained the access control list only for those clients listed on the access control list.

According to a tenth aspect there is presented a computer program for handling access to a service in a network, the computer program comprising computer program code which, when run on processing circuitry of a network switch operatively connected to a server of the service to the network, causes the network switch to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network controllers, these network switches, and these computer programs provide efficient handling of access to services in the network.

Advantageously these methods, these network controllers, these network switches, and these computer programs can limit security threats against business critical, but vulnerable, services for which no security patch exist (such as for legacy web services or other legacy services).

Advantageously these methods, these network controllers, these network switches, and these computer programs provide flexibility for timing the whitelisting process of the clients.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
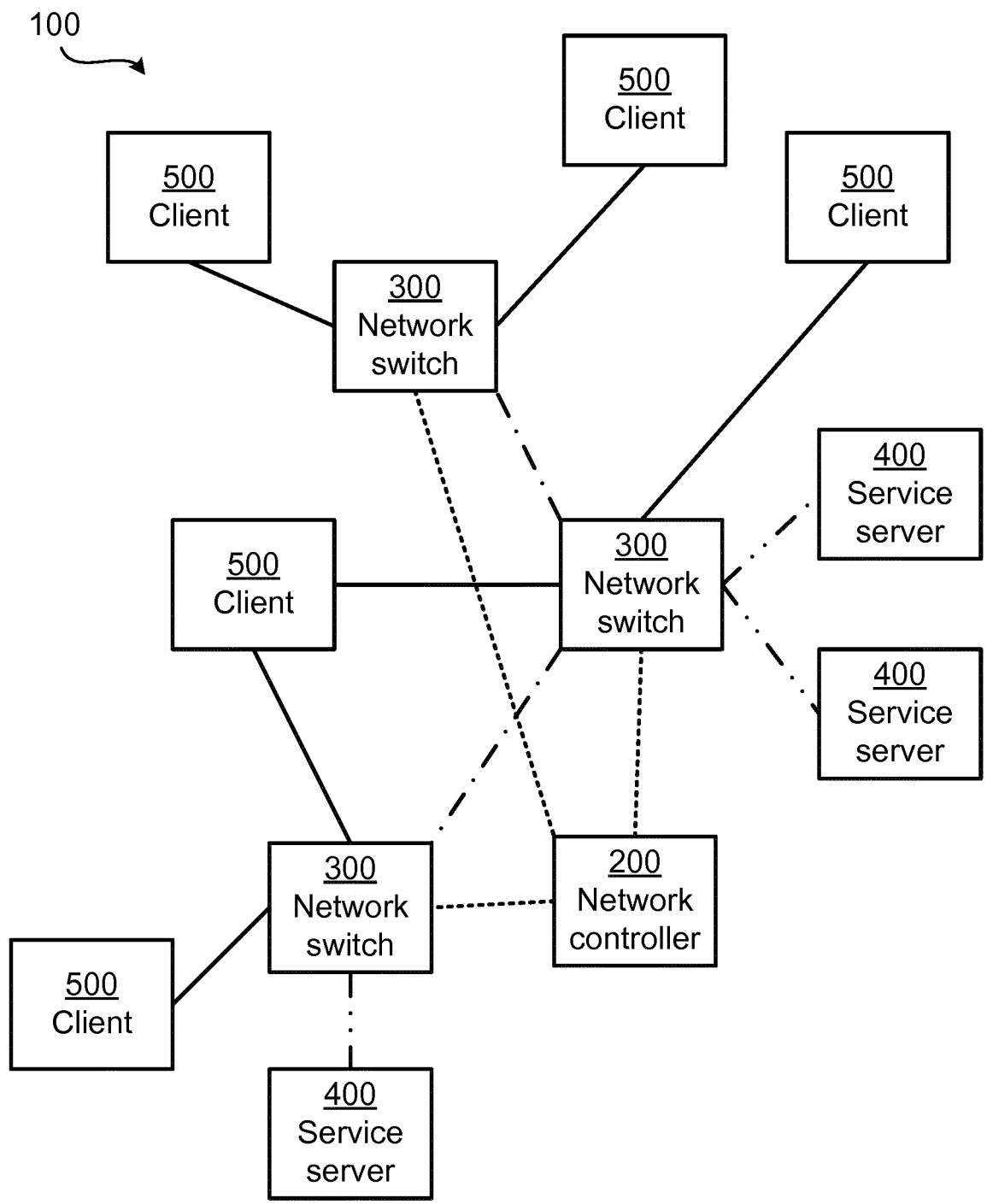
FIG. 1 is a schematic diagram illustrating a network according to embodiments.

FIG. 1 is a schematic diagram illustrating a network too where embodiments presented herein can be applied. The network too comprises a network controller 200, network switches 300, service servers 400 (hereinafter simply denoted server), and clients 500.

In general terms, the servers 400 provide services to the clients 500. The servers 400 are operatively connected to the network 100 via the network switches 300. Traffic in the network 100 between the servers 400 and the clients 500 is thus routed through one or more of the network switches 300. The operation of the network switches is controlled by the network controller 200. Particularly, the network controller 200 handles access to services in the network 100.

Examples of clients 500 include, but are not limited to, end-user equipment such as user equipment, mobile terminals, laptop computers, tablet computers, stationary computers, network equipped sensors or vehicles, and Internet-of-Things (IoT) devices. One example of a service is data reporting by the clients 500 to the server 400.

Further, all network nodes (clients 500, network switches 300, network controller 200, and servers 400) could be subject to virtualization, even though typically the clients 500 are physical devices. Further, the network switches 300, the network controller 200, and/or the servers 400 could be running on different virtual machines or containers.

The embodiments disclosed herein relate to mechanisms for handling access to a service in a network too. In order to obtain such mechanisms there is provided a network controller 200, a method performed by the network controller 200, a computer program product comprising code, for example in the form of a computer program, that when run on processing circuitry of the network controller 200, causes the network controller 200 to perform the method. In order to obtain such mechanisms there is further provided a network switch 300, a method performed by the network switch 300, and a computer program product comprising code, for example in the form of a computer program, that when run on processing circuitry of the network switch 300, causes the network switch 300 to perform the method.

Figure 2:
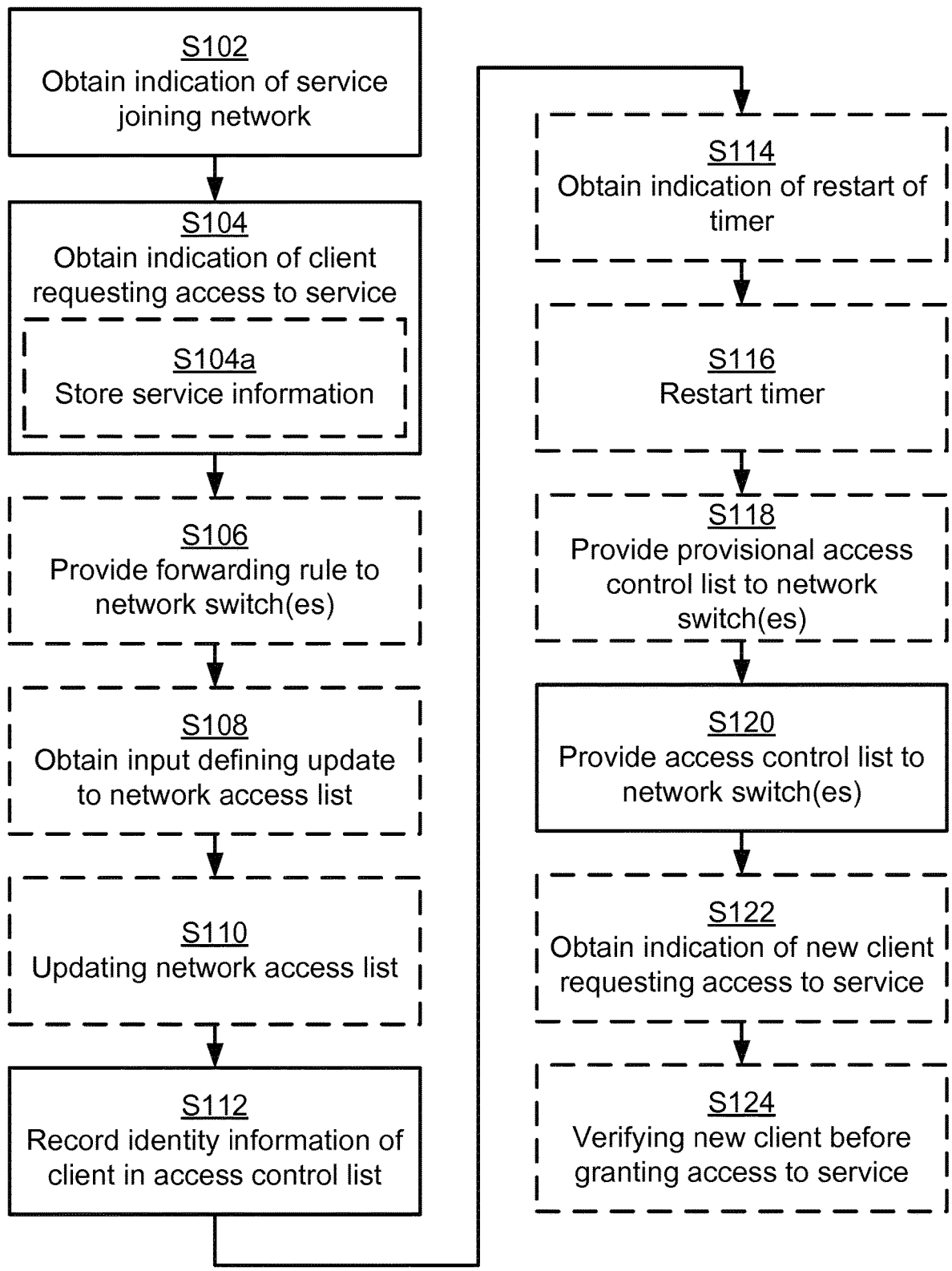
FIGS. 2 and 3 are service flowcharts of methods according to embodiments.
Figure 3:
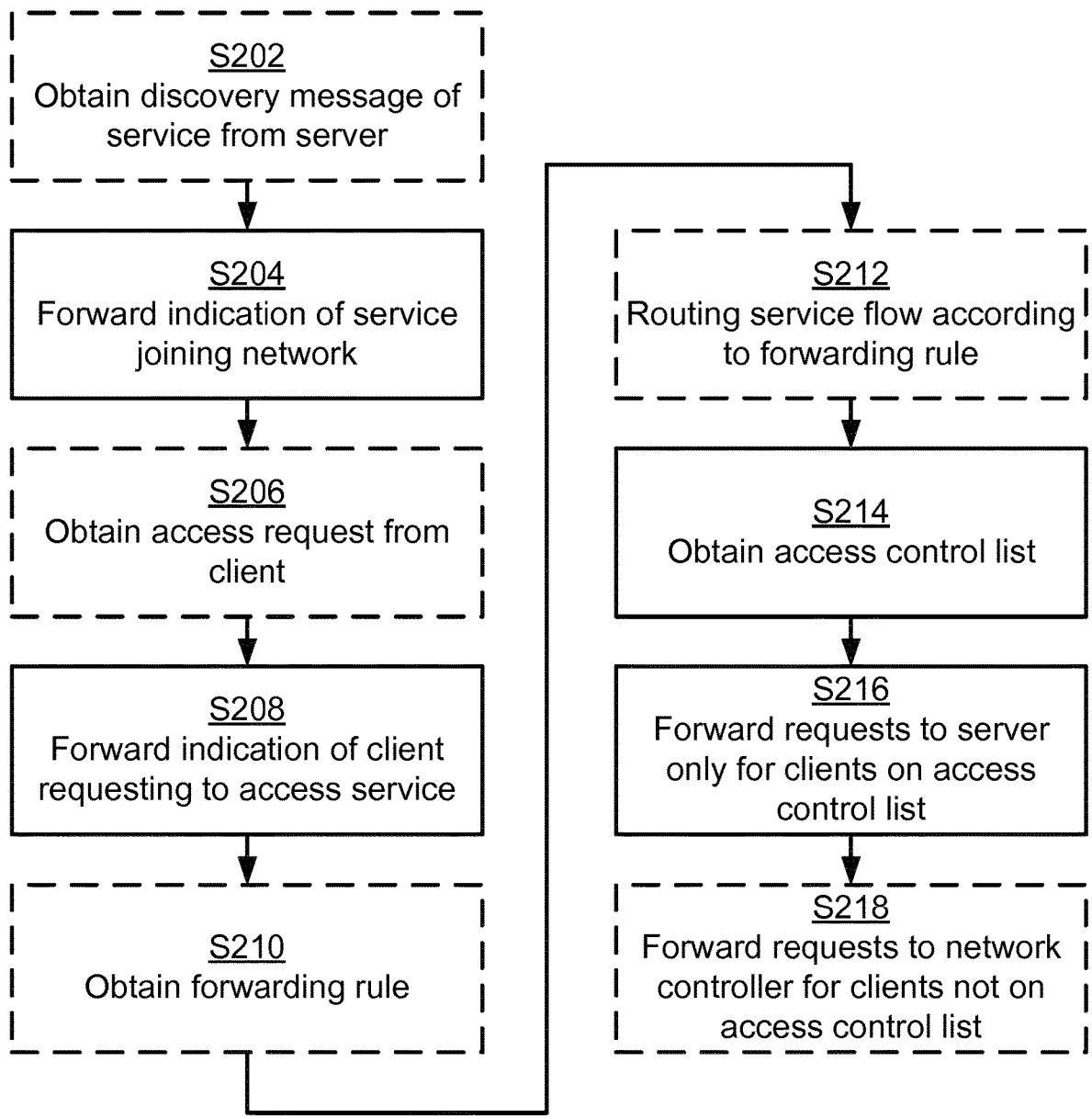

FIG. 2 is a service flowchart illustrating embodiments of methods for handling access to a service in a network 100 as performed by the network controller 200. FIG. 3 is a service flowchart illustrating embodiments of methods for handling access to a service in a network 100 as performed by the network switch 300. The methods are advantageously provided as computer programs 920a, 920b.

Reference is now made to FIG. 2 illustrating a method for handling access to a service in a network 100 as performed by the network controller 200 according to an embodiment.

As will be disclosed below, once a service is accessible in the network 100, the network switch 300 forwards an indication relating thereto to the network controller 200. It is assumed that such an indication is obtained by the network controller 200. Particularly, the network controller 200 is configured to perform step S102:

S102: The network controller 200 obtains an indication of the service being accessible in the network 100. The indication is received from the network switch 300. The network switch 300 is operatively connecting a server 400 of the service to the network 100. The indication causes a timer to start.

In some aspect the timer is only started for some particular services and hence, indications of other services being accessible in the network 100 will not cause the timer to be start. As will be disclosed below, the network switch 300 forwards an indication of a client 500 requesting to access the service to the network controller 200. It is assumed that such an indication is obtained by the network controller 200. Particularly, the network controller 200 is configured to perform step S104:

S104: The network controller 200 obtains an indication of a client 500 requesting to access the service. The indication is received from the network switch 300.

The identities of the clients 500 are collected during the lifecycle of the service. The network controller 200 therefore records the clients 500 connecting to the service. Particularly, the network controller 200 is configured to perform step S112:

S112: The network controller 200 records, only when the timer has not yet expired, identity information of the client 500 in an access control list.

This enables clients 500 for which identity information has been recorded to have automatic whitelist access to the service when the configured timeout of the timer has passed (i.e., even after expiration of the timer). In order to do so the access control list is sent to one or more network switches 300. Particularly, the network controller 200 is configured to perform step S120:

S120: The network controller 200 provides the access control list at least to the network switch 300 upon expiration of the timer.

This method enables prevention of unauthorized access from new clients 500 to old and outdated services without any manual configurations. This method could be applied in an SDN system that has been running for a while, or if reset, the method can be used for automatically generating new access policies for the services.

Providing the network access list in step S120 may involve the network controller 200 providing the network access list to all of the network switches 300 in the network too, not just to the edge switch on the path to the server 400. It is thus possible that the network controller 300 provides the access control list at once to all network switches 300. As will be further disclosed below, it is also possible that the network controller 200 provides an initial access control list and updates it later. In addition, it is also possible for the network controller 200 to set access control lists for specific network switches 300 in the network too so as to enable different access levels for different security zones in the network too.

Embodiments relating to further details of handling access to a service in a network 100 as performed by the network controller 200 will now be disclosed.

There could be different ways for the network controller 200 to be triggered to record the identity information of the client 500 as in step S112. According to an embodiment, instructions for the network controller 200 to record the identity information of the client 500 in the access control list is obtained as input by the network controller 200.

The network controller 200 can distinguish different clients 500 using their IP address or IP address ranges, etc. Possibly some protocol-specific techniques can be used, including credentials or cookies passed in HTTP or other protocol messages. Particularly, according to an embodiment the identity information is an IP address, an IP address range, a media access control (MAC), a transport port identifier, a tunnel identifier, a security parameter index, SPI, number, a fully qualified domain name (FQDN), a Uniform Resource Identifiers (URI), or a Uniform Resource Locators (URL). Thus, besides utilizing low-level identifiers (such as MAC, IP addresses, VLAN tags), high-level identifiers (such as URIs, URNs, public keys, public-key derived identifiers, or certificates) can be utilized when needed to identify the clients 500.

Similarly, services can be identified using MAC addresses, IP addresses, IP address ranges, virtual local area network (VLAN) tags or other tunnel identifiers (e.g. Security Parameter Index (SPI) in Internet Protocol Security (IPsec)), or application-layer identifiers such as Domain Name System (DNS) names, public keys, public-key derived identifiers, or certificates, URIs, or URLs. Thus, in some aspects the indication of the service being accessible in the network too comprises service information identifying the service. According to an embodiment the network controller 200 is therefore configured to perform (optional) step S104a as art of step S104:

S104a: The network controller 200 stores the service information.

The thus stored service information could comprise at least one of a MAC address, an IP address, an IP address range, a transport port identifier (such as Transmission Control Protocol (TCP) or User Datagram Protocol (UDP) ports), a tunnel identifier, an application-layer identifier, and hostname of the service.

In some aspects the the network switch 300 routes service flows of the client 500 in accordance with a forwarding rule. The forwarding rule could be provided by the network controller 200. Particularly, according to an embodiment the network controller 200 is configured to perform (optional) step S106:

S106: The network controller 200 provides a forwarding rule to the network switch 300. The forwarding rule instructs the network switch 300 to route service flows of the client 500 that relate to the service to the server 400.

The forwarding rule may further implement additional actions for the service flows. For example, before routing a service flow, the forwarding rule may tag the service flow and then forward it. There could be one forwarding rule for each service flow. However, in some aspects the access control list defines permanent forwarding rules for all future service flows for the clients 500 on the access control list.

In some aspects the access control list is initiated beforehand. Particularly, according to an embodiment the access control list is obtained as a non-empty initial access control list and is obtained by the network controller 200 before obtaining the indication of the client 500 requesting to access the service (as in step S104).

Further, in some aspects the access control list is updated by means of input. Particularly, according to an embodiment the network controller 200 is configured to perform (optional) steps S108 and S110:

S108: The network controller 200 obtains input. The input defines an update to the network access list. The input is obtained without the network controller 200 obtaining any corresponding indication of any client 500 requesting to access the service to the network controller 200.

S110: The network controller 200 updates the network access list according to the input (as obtained in step S108).

There could be different ways to determine the expiration of the timer. In some aspects the time-out period is be automated and either fixed (such as hard time-out based, starting from the service boot up) or dynamic (for instance, N seconds counting from the last connection attempt). Particularly, according to an embodiment a time-out period defining the expiration of the timer is set either by the network controller 200 itself or by input obtained by the network controller 200. Further, the timer could be started either by the network controller 200 itself or by input obtained by the network controller 200.

Further, the timeout could be manual in the sense that administrative human interaction, or other input, is required to inform the network controller 200 that the timeout has passed. Particularly, according to an embodiment a value defining the expiration of the timer is obtained as input by the network controller 200

In some aspects the timer is reactivated. There could be different ways to reactivate the timer. According to an embodiment the network controller 200 is configured to perform (optional) steps S114 and S116:

S114: The network controller 200 obtains an indication of restarting of the timer.

S116: The network controller 200 restarts the timer in response thereto.

The indication in step S114 could be obtained either before or after expiration of the timer.

According to an embodiment the timer is re-started every time an indication of a new client 500 requesting to access the service is obtained before the timer has not yet expired.

In some aspects the network controller 200 disseminates information about clients 500 to the network switches 300 before expiration of the timer. Thus, according to an embodiment the access control list until expiration of the timer is denoted a provisional access control list and the network controller 200 is configured to perform (optional) step S118:

S118: The network controller 200 provides the provisional access control list to at least the network switch 300 before expiration of the timer.

The network controller 200 could thus already disseminate information about the clients 500 to all of the network switches 300 in order to avoid unnecessary forwarding of information to the network controller 200, which otherwise might occur, for example, in case a single client 500 connects two or more times to the same server 400 using different edge switches.

As will be disclosed, the network switch 300 could be configured to, for those clients 500 not listed on the access control list, forward any access requests for the service from clients 500 as received after having obtained the access control list. Hence, according to an embodiment the network controller 200 is configured to perform (optional) step S122:

S122: The network controller 200 obtains an indication of another client 500 requesting to access the service after expiration of the timer. The identity information of this so-called another client 500 is not in the access control list.

The network controller 200 could then perform additional verification of the so-called another client 500 before granting the so-called another client 500 access to the service. Particularly, according to an embodiment the network controller 200 is configured to perform (optional) step S124:

S124: The network controller 200 verifies that the so-called another client 500 is allowed to access the service before granting the so-called another client 500 access to the service.

According to one example, the network controller 200 could perform the verification in step S124 by making regular SDN decision on the service flow of the so-called another client 500. According to another example the network controller 200 could perform long-time analysis of the service flow before determining whether to add the so-called another client 500 to the access control list. Such long-time analysis might be required e.g. in a public network. The long analysis could e.g. involve to verify the complete authentication flow between the so-called another client 500 and the server 400 and then the so-called another client 500 might only be added to the access control list if successfully authenticated to the server 400. One way to enable long-time analysis is by means of the forwarding rules. For example, the forwarding rules could request the network switch 300 to send the service flows of client nodes not on the access control list to the network controller 200.

Reference is now made to FIG. 3 illustrating a method for handling access to a service in a network too as performed by the network switch 300 according to an embodiment. The network switch 300 is operatively connecting a server 400 of the service to the network too.

Once a service is accessible in the network too the network switch 300 forwards an indication relating thereto to the network controller 200. Hence, the network switch 300 is configured to perform step S204:

S204: The network switch 300 forwards an indication of the service being accessible in the network too to the network controller 200.

Further, indications of clients 500 requesting to access the service are forwarded to the network controller 200. Hence, the network switch 300 is configured to perform step S208:

S208: The network switch 300 forwards an indication of a client 500 requesting to access the service to the network controller 200.

As disclosed above, the network controller 200 provides an access control list to the network switch 300. It is assumed that the access control list is obtained by the network switch 300 and hence that the network switch 300 is configured to perform step S214:

S214: The network switch 300 obtains an access control list from the network controller 200. The access control list comprises identity information of the client 500.

As disclosed above, the network access list acts as a whitelist and the network switch 300 thus only forwards access requests for the service from clients 500 on the network access list. Particularly, the network switch 300 is configured to perform step S216:

S216: The network switch 300 forwards, to the server 400, any access requests for the service from clients 500 received after having obtained the access control list only for those clients 500 listed on the access control list.

Embodiments relating to further details of handling access to a service in a network too as performed by the network switch 300 will now be disclosed.

There could be different ways for the network switch 300 to obtain the indication of the service being accessible in the network too.

In some aspects the network switch 300 obtains a message of the service from the server 400. Particularly, according to an embodiment the network switch 300 is configured to perform (optional) step S202:

S202: The network switch 300 obtains a discovery message of the service from the server 400. The indication of the service being accessible in the network too is forwarded (as in step S204) to the network controller 200 from the network switch 300 in response thereto (i.e. in response to having obtained the discovery message).

In other aspects it is possible to register services manually to the network 100.

Once the service is made accessible, users, as defined by the clients 500, may access the service. As disclosed above, the network switch 300 is operatively connecting the server 400 of the service to the network 100 and therefore requests from clients 500 for the service are received by the network switch 300. Particularly, according to an embodiment the network switch 300 is configured to perform (optional) step S206:

S206: The network switch 300 obtains an access request for the service from the client 500. The indication of the client 500 requesting to access the service is forwarded (as in step S208) to the network controller 200 from the network switch 300 in response thereto (i.e. in response to having obtained the access request).

In some aspects the service flow from the client 500 is, by the network switch 300, forwarded according to forwarding rule. As disclosed above, the network controller 200 in an optional step S106 provides the forwarding rule to the network switch 300. Thus, according to an embodiment the access request has an associated service flow and the network switch 300 is configured to perform (optional) steps S210 and S212:

S210: The network switch 300 obtains a forwarding rule from the network controller 200. The forwarding rule instructs the network switch 300 to route at least one service flow of the client 500 that relate to the service to the server 400.

S212: The network switch 300 routes the service flow of the client 500 to the server 400 according to the forwarding rule.

There could be different ways for the network switch 300 to handle service flows received from clients 500 not on the access control list.

In some aspects the network switch 300 receives service flows from clients 500 not on the access control list. According to some aspects the network switch 300 simply drops service flows received from clients 500 not on the access control list (thus without performing any forwarding to the network controller 200).

In some aspects the network switch 300 informs the network controller 200 of the service flows, and/or forwards the service flows to the network controller 200. Particularly, according to an embodiment the network switch 300 is configured to perform (optional) step S218:

S218: The network switch 300 forwards, to the network controller 200, any access requests for the service from clients 500 as received after having obtained the access control list for those clients 500 not listed on the access control list.

In summary, when receiving a service flow from a client 500 not on the access control list the network switch 300 could either log the service flow and then drop the service flow (and optionally provide logged information to the network controller 200), or forward the service flow to the network controller 200.

Service flows of clients 500 not on the access control list could thereby be redirected to the network controller 200 for verification. Whether to forward or not forward the service flow could be defined in the forwarding rule.

Figure 4:
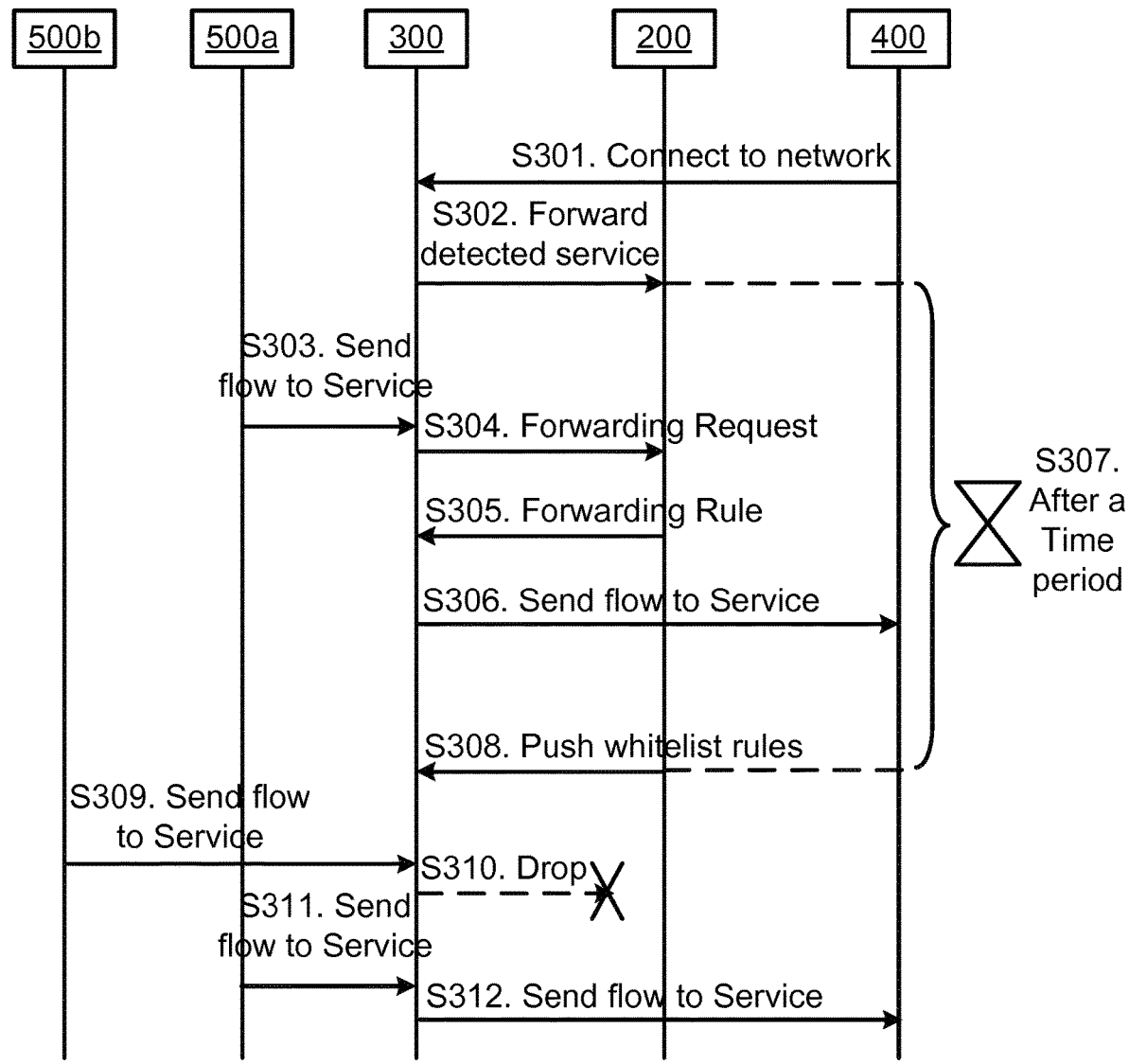
FIG. 4 is a signalling diagram according to an embodiment.

One particular embodiment for handling access to a service in a network too based on at least some of the above disclosed embodiments will now be disclosed in detail with reference to the signalling diagram of FIG. 4.

In FIG. 4, for simplicity, a single network switch 300 is managed by the network controller 200. The network switch 300 connects at least one service of the server 400 to the rest of the network. Two clients 500a, 500b connect through the network too to the service over the network switch 300.

S301: The service joins the network too by the server 400 transmitting a discovery message using the address resolution protocol (ARP), the Dynamic Host Configuration Protocol (DHCP) or advertising itself using multicast DNS or dynamic DNS (DynDNS).

S302: The network switch 300 intercepts the discovery message from the server 400 and forwards copies of the message to the network controller 200 (e.g. with packet-in messages in OpenService flow). The network controller 200 thus receives the messages and possibly approves them with the network switch 300. The network controller 200 records the service information (such as MAC address, IP address, possibly hostname) and sets a time-out period for the reachability of the service.

S303: Client 500a starts a service flow (e.g. a HTTP session over TCP) with the service of the server 400.

S304: The network switch 300 forwards the service flow to the network controller 200 for decision making.

S305: Since the time-out period for the service is not yet reached (i.e. the timer has not expired), the network controller 200 installs a forwarding rule to route the service flow to the service and records client 500a on an access control list representing a whitelist for the service.

S306: The network switch 300 forwards the service flow to the server 400 of the service.

S307: The timeout period for the service reachability for the service expires at the network controller 200.

S308: The network controller 200 pushes the access control list and forwarding rules to the network switch 300.

In some aspects the control list and the forwarding rules form one single part; for example the access control list can be part of the forwarding rules, or vice versa. As a result thereof the network switch 300 does not need to forward messages of new service flows to the network controller 200 for decision making. Only service flows of previously connected clients 500a will be allowed to pass through the network switch 300, whilst service flows from any other clients 500b will be dropped.

S309: Client 500b starts a service flow (e.g. a HTTP session over TCP) with the service of the server 400.

S310: Because the client 500b is not on the access control list, the network switch 300 drops the request. This could prevent a possible denial-of-service attack (DoS attack) from being successful.

S311: Client 500a is still allowed to access the service of the server 400 according to the forwarding rules since client 500a is on the access control list.

Figure 5:
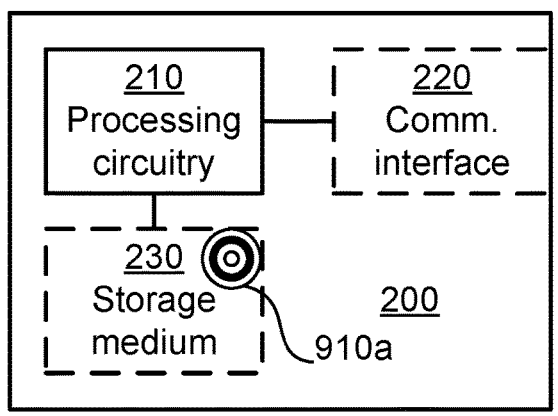
FIG. 5 is a schematic diagram showing functional units of a network controller according to an embodiment.

FIG. 5 schematically illustrates, in terms of a number of functional units, the components of a network controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network controller 200 to perform a set of operations, or steps, S102-S124, as disclosed above. For example, the storage medium 230 may store the set of operations, and the processing circuitry 210 may be configured to retrieve the set of operations from the storage medium 230 to cause the network controller 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network controller 200 may further comprise a communications interface 220 for communications at least with entities, nodes, functions, or devices of the network 100. As such the communications interface 220 may comprise one or more transmitters and receivers, comprising analogue and digital components.

The processing circuitry 210 controls the general operation of the network controller 200 e.g. by sending data and control signals to the communications interface 220 and the storage medium 230, by receiving data and reports from the communications interface 220, and by retrieving data and instructions from the storage medium 230. Other components, as well as the related functionality, of the network controller 200 are omitted in order not to obscure the concepts presented herein.

Figure 6:
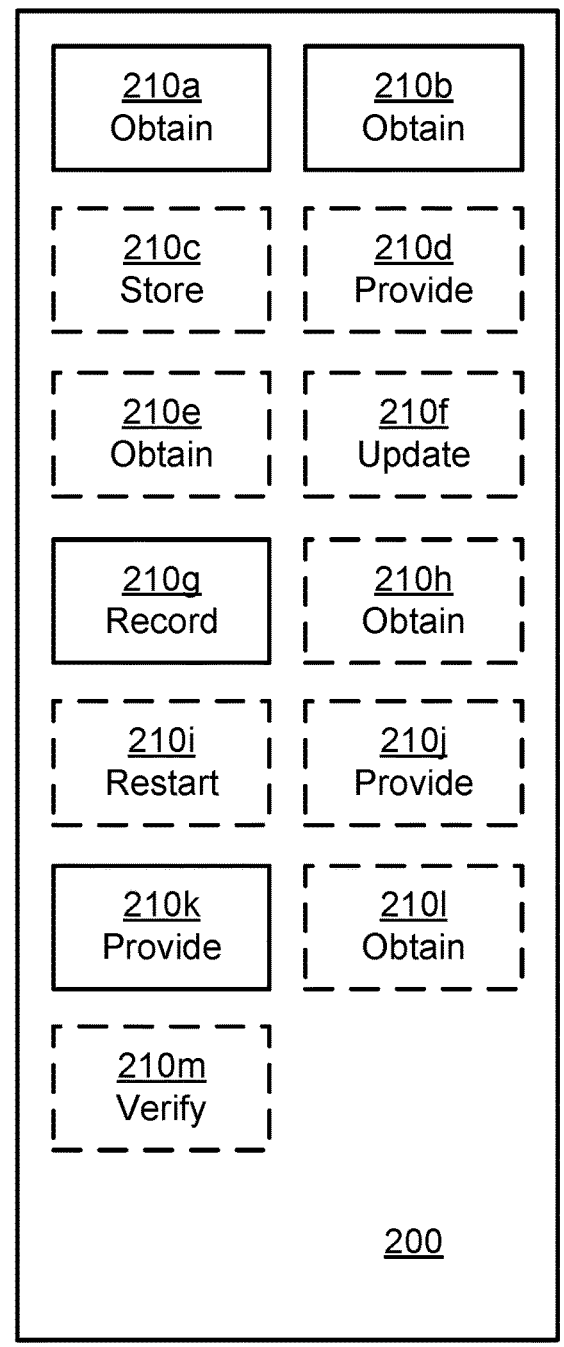
FIG. 6 is a schematic diagram showing functional modules of a network controller according to an embodiment.

FIG. 6 schematically illustrates, in terms of a number of functional modules, the components of a network controller 200 according to an embodiment. The network controller 200 of FIG. 6 comprises a number of functional modules; a first obtain module 210a configured to perform step S102, a second obtain module 210b configured to perform step S104, a record module 210g configured to perform step S112, and a provide module 210k configured to perform step S120.

The network controller 200 of FIG. 6 may further comprise a number of optional functional modules, such as any of a store module 210c configured to perform step S104a, a second provide module 210d configured to perform step S106, a third obtain module 210e configured to perform step S108, an update module 210f configured to perform step S110, a fourth obtain module 210h configured to perform step S114, a restart module 210i configured to perform step S116, a third provide module 210j configured to perform step S118, a fifth obtain module 210I configured to perform step S122, and a verify module 210m configured to perform step S124.

In general terms, each functional module 210a-210m may be implemented in hardware or in software. Preferably, one or more or all functional modules 210a-210m may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210m and to execute these instructions, thereby performing any steps of the network controller 200 as disclosed herein.

Figure 7:
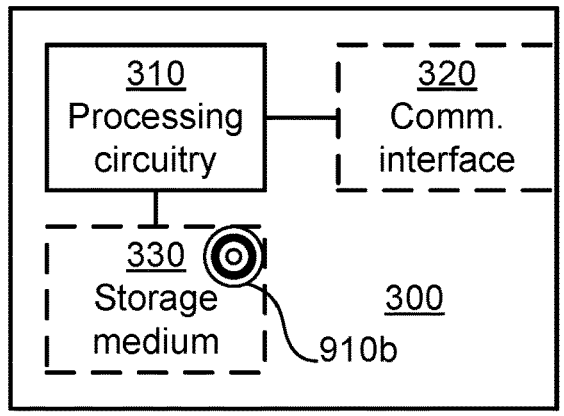
FIG. 7 is a schematic diagram showing functional units of a network switch according to an embodiment.

FIG. 7 schematically illustrates, in terms of a number of functional units, the components of a network switch 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the network switch 300 to perform a set of operations, or steps, S202-S218, as disclosed above. For example, the storage medium 330 may store the set of operations, and the processing circuitry 310 may be configured to retrieve the set of operations from the storage medium 330 to cause the network switch 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network switch 300 may further comprise a communications interface 320 for communications with entities, nodes, functions, or devices of the network 100. As such the communications interface 320 may comprise one or more transmitters and receivers, comprising analogue and digital components.

The processing circuitry 310 controls the general operation of the network switch 300 e.g. by sending data and control signals to the communications interface 320 and the storage medium 330, by receiving data and reports from the communications interface 320, and by retrieving data and instructions from the storage medium 330. Other components, as well as the related functionality, of the network switch 300 are omitted in order not to obscure the concepts presented herein.

Figure 8:
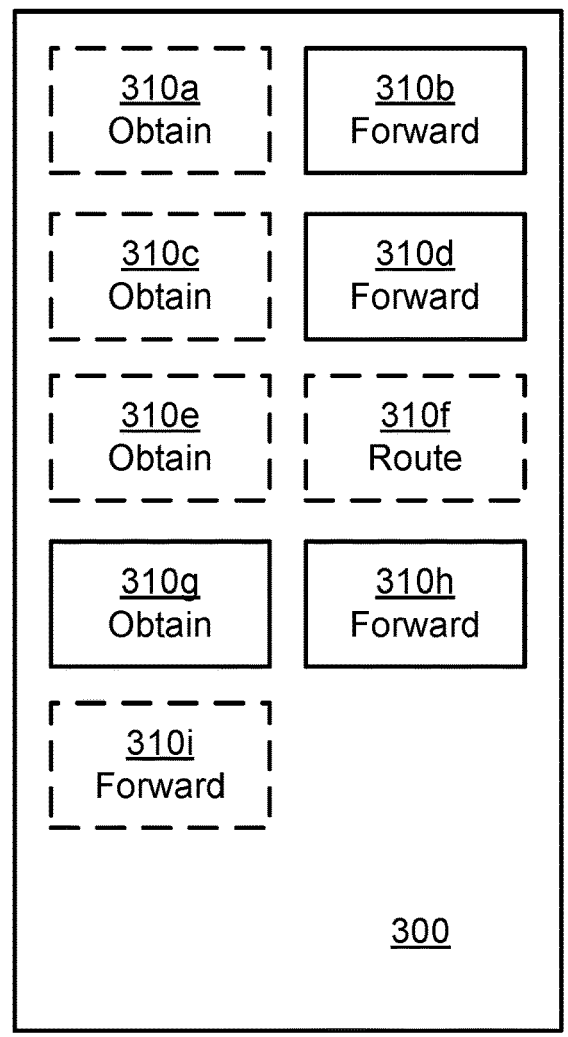
FIG. 8 is a schematic diagram showing functional modules of a network switch according to an embodiment.

FIG. 8 schematically illustrates, in terms of a number of functional modules, the components of a network switch 300 according to an embodiment. The network switch 300 of FIG. 8 comprises a number of functional modules; a first forward module 310b configured to perform step S204, a second forward module 310d configured to perform step S208, a first obtain module 310g configured to perform step S214, and a third forward module 310h configured to perform step S216.

The network switch 300 of FIG. 8 may further comprise a number of optional functional modules, such as any of a second obtain module 310a configured to perform step S202, a third obtain module 310c configured to perform step S206, a fourth obtain module 310e configured to perform step S210, a route module 310f configured to perform step S212, and a fourth forward module 310i configured to perform step S218.

In general terms, each functional module 310a-310i may be implemented in hardware or in software. Preferably, one or more or all functional modules 310a-310i may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310i and to execute these instructions, thereby performing any steps of the network switch 300 as disclosed herein.

The network controller 200 and/or network switch 300 may be provided as a standalone device or as a part of at least one further device. In some aspects the network controller 200 and the network switch 300 are co-located so as to form a single entity.

Alternatively, functionality of the network controller 200 and/or network switch 300 may be distributed between at least two devices, or nodes. Thus, a first portion of the instructions performed by the network controller 200 and/or network switch 300 may be executed in a first device, and a second portion of the of the instructions performed by the network controller 200 and/or network switch 300 may be executed in a second device; the herein disclosed embodiments are not limited to any particular number of devices on which the instructions performed by the network controller 200 and/or network switch 300 may be executed. Hence, the methods according to the herein disclosed embodiments are suitable to be performed by a network controller 200 and/or network switch 300 residing in a cloud computational environment. Therefore, although a single processing circuitry 210, 310 is illustrated in FIGS. 5 and 7 the processing circuitry 210, 310 may be distributed among a plurality of devices, or nodes. The same applies to the functional modules 210a-210m, 310a-310i of FIGS. 6 and 8 and the computer programs 920a, 920b of FIG. 9 (see below).

Figure 9:
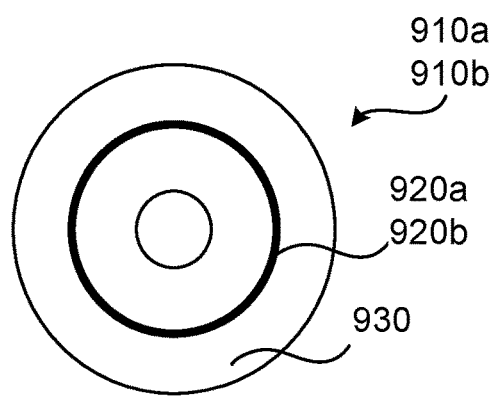
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network controller 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the network switch 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling access to a service in a network, the method being performed by a network controller, the method comprising:
    obtaining an indication of the service being accessible in the network, the indication being received from a network switch operatively connecting a server of the service to the network, the indication causing a timer to start;
    obtaining an indication of a client requesting to access the service, the indication being received from the network switch;
    recording, only when the timer has not yet expired, identity information of the client in an access control list; and
    providing the access control list at least to the network switch upon expiration of the timer.

2. The method according to claim 1, wherein the indication of the service being accessible in the network comprises service information identifying the service, the method further comprising:
    storing the service information.

3. The method according to claim 1, wherein a time-out period defining the expiration of the timer is set either by the network controller itself or by input obtained by the network controller.

4. The method according to claim 1, wherein the timer is started either by the network controller itself or by input obtained by the network controller.

5. The method according to claim 1, wherein instructions for the network controller to record the identity information of the client in the access control list is obtained as input by the network controller.

6. The method according to claim 1, wherein the timer is re-started every time an indication of a new client requesting to access the service is obtained before the timer has not yet expired.

7. The method according to claim 1, wherein a value defining the expiration of the timer is obtained as input by the network controller.

8. The method according to claim 1, further comprising:
    obtaining an indication of restarting of the timer; and
    restarting the timer in response thereto.

9. The method according to claim 1, wherein the identity information is an Internet Protocol, IP, address, an IP address range, a media access control, MAC, address, a transport port identifier, a tunnel identifier, a security parameter index, SPI, number, a fully qualified domain name, FQDN, a uniform resource identifier, URI, or a uniform resource locator, URL, a public key, a public-key derived identifier, or a certificate.

10. The method according to claim 1, further comprising:
    providing a forwarding rule to the network switch, the forwarding rule instructing the network switch to route service flows of the client that relate to the service to the server.

11. The method according to claim 1, wherein the access control list until expiration of the timer is denoted a provisional access control list, the method further comprising:
    providing the provisional access control list to at least the network switch before expiration of the timer.

12. The method according to claim 1, further comprising:
    obtaining an indication of another client requesting to access the service after expiration of the timer, wherein identity information of said another client is not in the access control list; and
    verifying that said another client is allowed to access the service before granting said another client access to the service.

13. The method according to claim 1, wherein the access control list is obtained as a non-empty initial access control list and is obtained before obtaining the indication of the client requesting to access the service.

14. The method according to claim 1, further comprising:
    obtaining input defining an update to the network access list without obtaining any corresponding indication of any client requesting to access the service to the network controller; and
    updating the network access list according to the input.

15. A method for handling access to a service in a network, the method being performed by a network switch operatively connecting a server of the service to the network, the method comprising:
    forwarding an indication of the service being accessible in the network to the network controller;
    forwarding an indication of a client requesting to access the service to the network controller;
    obtaining an access control list from the network controller, the access control list comprising identity information of the client; and
    forwarding, to the server, any access requests for the service from clients received after having obtained the access control list only for those clients listed on the access control list.

16. The method according to claim 15, further comprising:
    obtaining a discovery message of the service from the server, and wherein the indication of the service being accessible in the network is forwarded in response thereto.

17. The method according to claim 15, further comprising:
    obtaining an access request for the service from the client, and wherein the indication of the client requesting to access the service is forwarded in response thereto.

18. The method according to claim 15, further comprising:

forwarding, to the network controller, any access requests for the service from clients as received after having obtained the access control list for those clients not listed on the access control list.

19. A network controller for handling access to a service in a network, the network controller comprising:
   processing circuitry; and
   a storage medium storing instructions that, when executed by the processing circuitry, cause the network controller to:
      obtain an indication of the service being accessible in the network, the indication being received from a network switch operatively connecting a server of the service to the network, the indication causing a timer to start;
      obtain an indication of a client requesting to access the service, the indication being received from the network switch;
      record, only when the timer has not yet expired, identity information of the client in an access control list; and
      provide the access control list at least to the network switch upon expiration of the timer.

20. A network switch for handling access to a service in a network, the network switch being operatively connected to a server of the service to the network and comprising:
   processing circuitry; and
   a storage medium storing instructions that, when executed by the processing circuitry, cause the network switch to:
      forward an indication of the service being accessible in the network to the network controller;
      forward an indication of a client requesting to access the service to the network controller;
      obtain an access control list from the network controller, the access control list comprising identity information of the client; and
      forward, to the server, any access requests for the service from clients received after having obtained the access control list only for those clients listed on the access control list.

* * * * *